(12) United States Patent
Frank

(10) Patent No.: US 6,384,407 B1
(45) Date of Patent: May 7, 2002

(54) INFRARED RECEIVER MOUNT WITH DIRECTIONAL RECEPTION CAPABILITIES

(75) Inventor: Jeff W. Frank, Mayville, WI (US)

(73) Assignee: TAB Products Co, Palo Alto, CA (US)

( * ) Notice: Subject to any disclaimer, the term of this patent is extended or adjusted under 35 U.S.C. 154(b) by 0 days.

(21) Appl. No.: 09/190,875

(22) Filed: Nov. 12, 1998

(51) Int. Cl.[7] .................................................. H01J 5/02
(52) U.S. Cl. ........................ 250/239; 250/221; 312/201
(58) Field of Search ................................. 250/239, 221, 250/559.4, 234, 236, 235; 356/3.05, 139.05, 139.06; 359/822; 312/201, 200; 340/555–557; 362/269, 276, 362, 382

(56) References Cited

U.S. PATENT DOCUMENTS

| | | | |
|---|---|---|---|
| 3,401,311 A | * 9/1968 | Burch | 361/142 |
| 3,408,501 A | * 10/1968 | Thompson | 250/239 |
| 4,331,868 A | 5/1982 | Mash | 250/239 |
| 4,704,524 A | * 11/1987 | Masaki et al. | 250/239 |
| 4,978,857 A | * 12/1990 | Juengel | 250/551 |
| 5,025,305 A | 6/1991 | Tomisawa et al. | 357/72 |
| 5,130,531 A | 7/1992 | Ito et al. | 250/216 |
| 5,153,429 A | 10/1992 | Takahashi | 250/239 |
| 5,359,191 A | 10/1994 | Griesemer et al. | 250/221 |
| 5,427,444 A | 6/1995 | Griesemer | 312/201 |
| 5,453,638 A | 9/1995 | Nagele et al. | 257/414 |
| 5,467,228 A | * 11/1995 | Lin | 359/822 |
| 5,502,598 A | * 3/1996 | Kimura et al. | 359/814 |
| 5,569,910 A | 10/1996 | Griesemer | 250/221 |
| 5,677,529 A | 10/1997 | Hofmann et al. | 250/221 |
| 5,946,127 A | * 8/1999 | Nagata | 359/280 |

* cited by examiner

Primary Examiner—Que T. Le
Assistant Examiner—Thanh X. Luu
(74) Attorney, Agent, or Firm—Timothy J. Ziolkowski; Cook & Franke SC

(57) ABSTRACT

An infrared receiver mount is disclosed that is capable of directional reception with discrete positions and is applicable for use in a mobile carriage system. An infrared receiver is mounted within a conical section of an outer cover which directs the infrared receiver to receive infrared transmission from a first given angle of reception. The outer cover contains a plurality of grooves, which are engageable with a plurality of tabs located on a base plate to prevent rotation of the infrared receiver. The tab and groove system provides a discrete number of directions for the infrared receiver to receive infrared transmission from a second angle of reception. While this second angle of reception is adjustable, the first angle of reception is predetermined. In one application, the infrared receiver is mounted to the lower portion of a carriage in order to receive light beams from an infrared transmitter. By disengaging the tabs from the grooves, the infrared receiver is rotatable to vary the second angle of reception. This locking mechanism can then be locked into one of a distinct number of directions. The locking mechanism provides more precise placement of the infrared receivers in an optimal receiving orientation and prevents unintentional movement of the infrared receiver from its desired reception position.

41 Claims, 3 Drawing Sheets

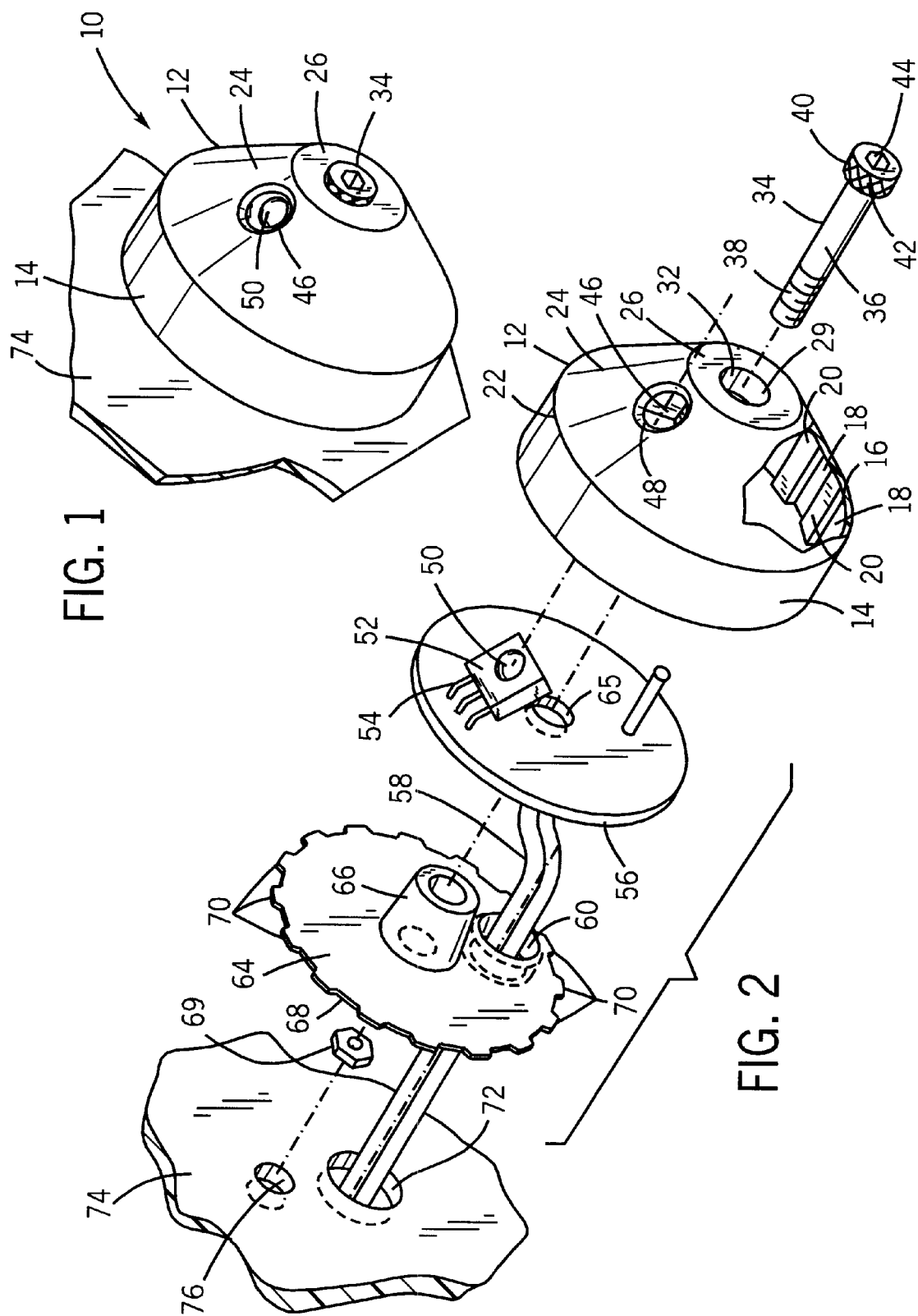

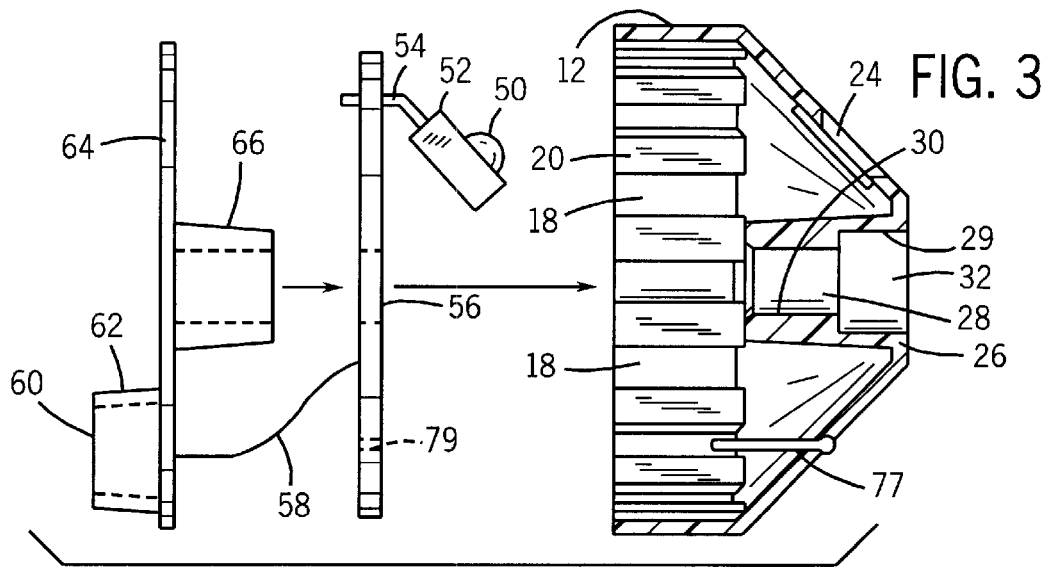
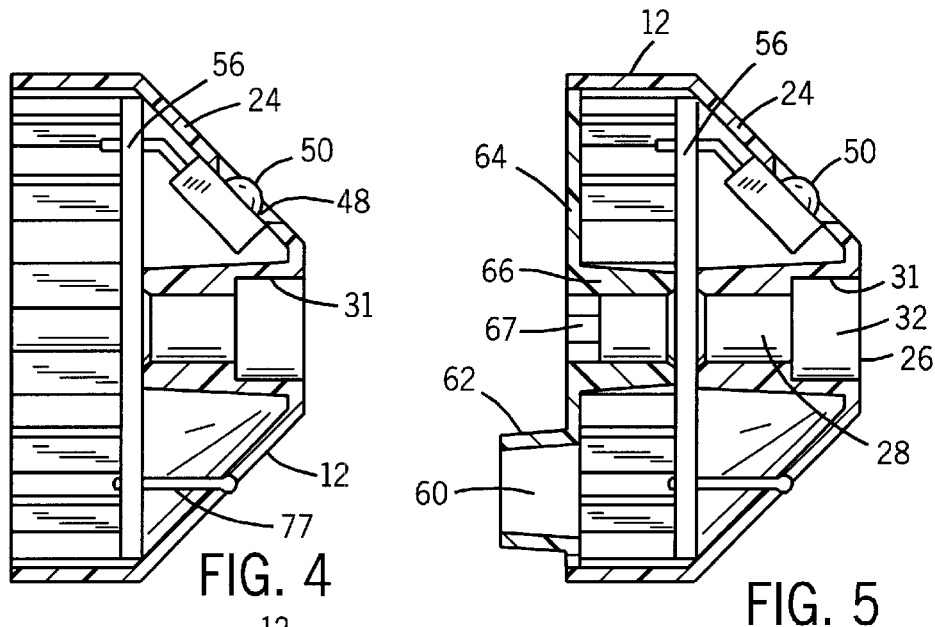
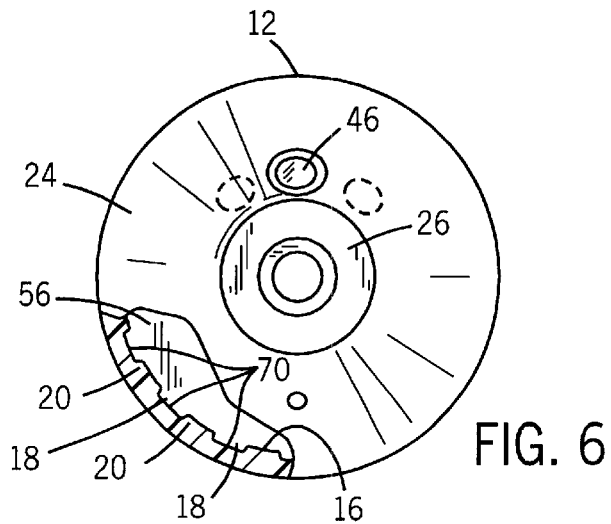

INFRARED RECEIVER MOUNT WITH DIRECTIONAL RECEPTION CAPABILITIES

BACKGROUND OF THE INVENTION

The present invention relates generally to receiver mounts for mounting a receiver to allow directional reception of electromagnetic radiation, and in particular, to an infrared receiver mount for use in a mobile carriage unit.

Infrared systems are often utilized to detect the presence of an object, as is common between shelving units in mobile carriage systems. These infrared systems typically are used to prevent unwanted movement of the carriages toward a person located between the carriages. Such infrared systems use one or more infrared transmitters and one or more corresponding infrared receivers to sense the infrared beams transmitted by the infrared transmitters. Typically, the blockage of an infrared beam, as determined by the absence of an infrared beam, is indicative of a hazard, and continued movement of the carriage is then prevented.

Because accurate detection of any obstacle between carriages is necessary before movement of a carriage, the orientation of the infrared transmitter and receiver, placed specifically to detect obstacles between the carriages, must not be disorientated or disturbed. In order to maintain the infrared beam paths, it is important that the infrared transmitters and receivers do not move from their preset orientations. Therefore, once established, the orientation of the infrared transmitter and infrared receivers is critical. However, because the transmitters can have a wide beam width and are usually mounted out of reach, it was found that the receiver orientation is most critical.

In the past, the orientation of the infrared receiver was left with the installer, which requires a rather accurate and time consuming installation. Some systems have infinite mounting positions or have a freely rotating infrared receiver mount that may place the infrared receiver at an angle of reception which is not conducive to proper infrared beam reception. If the infrared receiver is not mounted accurately to receive the transmitted infrared beam, the infrared system will not operate correctly. Further, it is critical to the safe operation of such systems that the preset orientation of the receiver be maintained during normal operation. If someone inadvertently bumps or steps on the mount while climbing on a movable shelf, the angle of receiver reception can change and thereafter disrupt accurate operation of the system.

Because of the potential for inaccuracies associated with initial installation or that can arise during maintenance or replacement or during use, it would be desirable to have discrete settings on the infrared receiver mount to allow for specific angles of reception for the infrared receiver. The limited number of settings allows for more precise directional orientation of the infrared receivers.

Additionally, since the infrared receivers are used in a variety of configurations, it is necessary to be able to alter the direction of the infrared receiver while strictly maintaining the direction in any particular configuration.

Therefore, it would be desirable to have an infrared receiver mount that solves the aforementioned problems so that the infrared receiver can easily be rotated into a desired direction and then locked into place.

SUMMARY OF THE INVENTION

The present invention advantageously provides an electromagnetic radiation receiver mount with discrete reception capabilities that overcomes the aforementioned problems.

In accordance with one aspect of the invention, an electromagnetic radiation receiver mount is provided that is capable of being rotated and locked into a discrete number of settings to allow directional electromagnetic radiation reception. The electromagnetic radiation receiver mount has a cover assembly in which there is an electromagnetic radiation receiver opening. An electromagnetic radiation receiver is positioned within the electromagnetic radiation receiver opening to receive light therein. The cover assembly also includes a first portion of a locking mechanism. A base plate is provided that is engageable with the cover assembly and fixedly attachable to a fixed surface. The base plate has a second portion of the locking mechanism which is engageable and lockable with the first portion of the locking mechanism. The locking mechanism is used as a means for locking the cover assembly to the base plate in a fixed position. The locking mechanism also allows for the unlocking of the cover assembly from the base plate to allow rotation of the cover assembly with respect to the base plate in discrete steps thereby creating the discrete number of directional electromagnetic radiation reception settings.

In accordance with another aspect of the invention, an electromagnetic radiation receiver mount comprises a base plate which includes an outer edge. The outer edge is located circumferentially about the base plate and is the location for the locking function of the electromagnetic radiation receiver mount. At the outer edge are a series of tabs which are in spaced relation. These tabs comprise one portion of the locking function on the electromagnetic radiation receiver mount. The electromagnetic radiation receiver mount also includes an outer cover which has an inner portion. The inner portion has a plurality of grooves which are in spaced relation, such that the grooves are capable of receiving the tabs of the outer edge of the base portion. When the base plate tabs are received into the outer cover grooves, the outer cover is in locking relationship with the base plate. The grooves compliment the tabs to provide an outer cover which is locked into place. Interposed between the base portion and the outer cover is an electromagnetic radiation receiver assembly. The electromagnetic radiation receiver assembly includes an electromagnetic radiation receiver mounted to a top portion of the electromagnetic radiation receiver assembly. The outer cover includes an aperture which is sized to receive the electromagnetic radiation receiver, such that the outer cover and the electromagnetic radiation receiver are rotatable with respect to the base portion in predetermined intervals.

In accordance with another aspect of the invention, the electromagnetic radiation receiver mount of the present invention is incorporated into a mobile carriage system. The mobile carriage system has a first carriage and a second carriage movable toward the first carriage. An electromagnetic radiation transmitter is mounted to either the first carriage or the second carriage. At least two electromagnetic radiation receivers are mounted to the other carriage. A receiver mount is used to mount the electromagnetic radiation receiver to either the first carriage or the second carriage. The receiver mount includes a base plate having an outer edge wherein a series of tabs extend therefrom. The mount also includes an outer cover having an inner portion which contains a plurality of grooves, such that the grooves are capable of receiving the tabs of the outer edge of the base plate. The tabs and groves define a predefined number of discrete rotational angles of reception. The outer cover also has a sloped or conical section with an opening therein for mounting an electromagnetic radiation receiver in the outer cover such that the electromagnetic radiation receiver can readily receive transmitted electromagnetic radiation from across an aisle.

A method of orienting an electromagnetic radiation signal receiver is also contemplated by one aspect of the present invention. The method includes the steps of providing an electromagnetic radiation receiver mount in accordance with the aforementioned aspects of the invention, loosening a retainer from the outer cover, disengaging the base plate from the outer cover, and rotating the outer cover with respect to the base plate into one of a fixed number of positions such that each outer cover position corresponds to a change in reception direction of the electromagnetic radiation receiver.

Accordingly, one object of the present invention is to provide an electromagnetic radiation receiver mount which allows the rotation of the electromagnetic radiation receiver in order to receive electromagnetic radiation from a number of directions. Another object of the invention is to provide an electromagnetic radiation receiver mount which allows the electromagnetic radiation receiver to be locked into a fixed number of positions, thereby providing more precise reception of electromagnetic radiation from a light source once a direction of reception has been established.

Various other features, objects, and advantages of the present invention will be made apparent from the detailed description and the drawings.

BRIEF DESCRIPTION OF THE DRAWINGS

The drawings illustrate the best mode presently contemplated for carrying out the invention.

In the drawings:

FIG. 1 is a perspective view of the infrared receiver mount in accordance with the present invention;

FIG. 2 is an exploded perspective view of the infrared receiver mount of FIG. 1;

FIG. 3 is an exploded sectional side view of the infrared receiver mount in accordance with the present invention;

FIG. 4 is a sectional side view showing the infrared receiver inserted into the outer cover in accordance with the present invention;

FIG. 5 is a sectional side view with the base plate added to the assembly of FIG. 4;

FIG. 6 is a front view, partially sectioned to show one embodiment of a locking mechanism in accordance with one aspect of the present invention;

DETAILED DESCRIPTION OF THE PREFERRED EMBODIMENT

Figure 7:
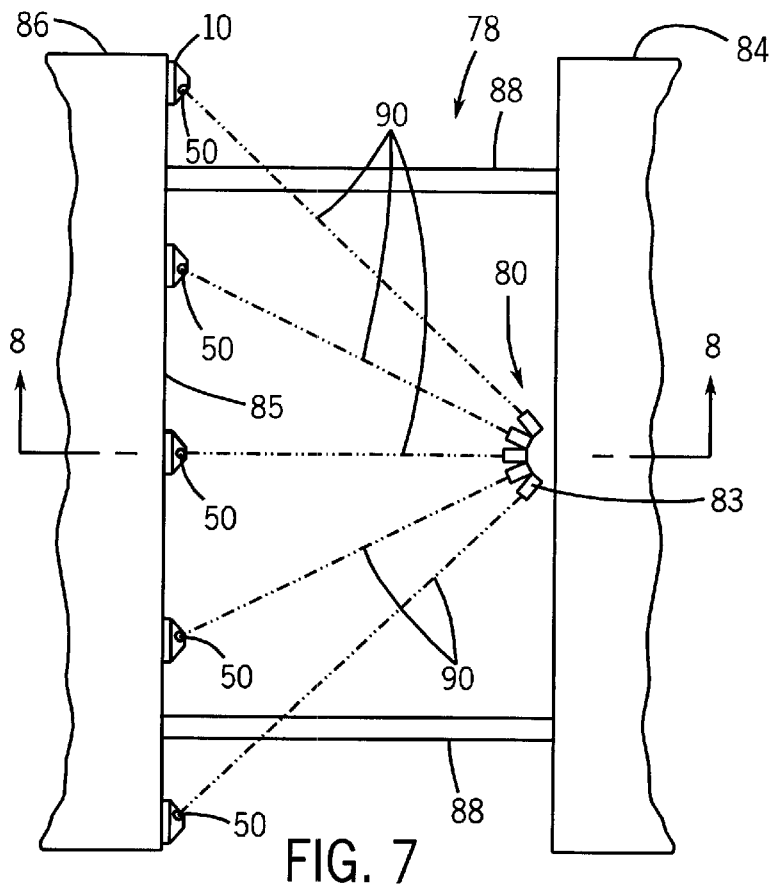
FIG. 7 is a schematic representation of a top plan view of a mobile carriage system in accordance with the present invention.

Referring to FIG. 1, an electromagnetic radiation receiver mount, preferably infrared receiver mount 10, is shown, and includes an outer cover 12. The outer cover 12 has a lower section 14 and a conical section 24. The conical section 24 includes an aperture 46 through which infrared receiver 50 extends. A retainer 34 is mounted through the infrared receiver mount 10 at flat surface 26 to maintain the infrared receiver mount 10 to fixed surface 74.

Referring now to FIG. 2, the lower section 14 of the outer cover 12 has an inner surface 16 having a series of spaced grooves 18, which are defined between projections 20, along the inner surface 16. Lower section 14 terminates at one end at an edge 22, which also defines one end of conical section 24. Conical section 24 is defined at its other end by a flat surface 26. The flat surface 26 includes a wall 29 having a countersink 32, which is perpendicular to and intersects with flat surface 26. The retainer 34 is preferably a bolt of standard construction having a shaft 36 with a threaded end 38 and a head 40. The head 40 has an outer edge 42 and an inner edge 44, which has a hexagonal configuration so as to accept the head of, for example, an allen wrench which would engage the retainer 34 at inner edge 44. The size of counterbore 32 is chosen to accommodate the head 40 of the retainer 34. The retainer 34 may be flush mounted with the flat surface 26 or the head 40 may preferably protrude to protect the conical section 24, which is preferably constructed of plastic.

Conical section 24 includes an aperture 46, which is defined at its outer edge by wall 48. The size of aperture 46 is selected to receive an electromagnetic radiation receiver, preferably infrared receiver 50. The infrared receiver 50 is separated from the fixed surface 74 by a printed circuit board 56 and a base plate 64. The base plate 64 includes at its outer edge 68 a series of spaced tabs 70. In operation, the tabs 70 of the base plate 64 interlock with the grooves 18 of the outer cover 12 to prevent the rotation of the outer cover 12 after the optimal reception position for the infrared receiver 50 is established. The tabs 70 and the grooves 18 form a locking mechanism to prevent the movement of the infrared receiver 50.

Although a total of sixteen tabs and grooves are shown and preferred, it is possible to achieve the same locking function with fewer tabs 70 than are located on base plate 64 and fewer grooves 18 than are located within inner edge of the outer cover 12. Even though the tabs 70 and the grooves 18 are preferably spaced similarly with respect to one another, the tabs 70 and the grooves 18 do not necessarily have to be evenly spaced about the base plate 64 and outer cover 12, respectively. Further, the tab and groove locking mechanism may be replaced with an altogether alternative or equivalent arrangement. The importance of this arrangement is that the locking mechanism provide an adequate locking connection to prevent inadvertent infrared receiver movement and provide a desired number of intervals for angular adjustment of the infrared receiver.

Similarly, other alternative or equivalent retaining and locking methods are contemplated. For example, the use of a biasing spring and multiple retainer clips (not shown) could be used to hold the outer cover 12 to the base plate 64 instead of bolt 34. By pulling on the outer cover and against the force of the spring, the tabs 70 would disengage the grooves 18 and permit rotation of the outer cover 12.

The infrared receiver 50 is attached to a printed circuit board 52 by conventional means and electrical leads 54 provide a path through infrared receiver assembly disk 56 and emerge to connect with wires 58. Wires 58 extend out through wiring hole 60 and extend into an aperture 72, which is located within a fixed surface 74, which is partially shown. The fixed surface 74 could be, for example, a carriage or any other suitable base which can support the infrared receiver mount. It is necessary that the wires 58 are long enough to permit rotation of the infrared receiver 50, even through a 360-degree rotation or more, without becoming too taut to prevent the electrical connections from disconnecting.

To retain the infrared receiver mount 10 to the fixed surface 74, the retainer 34 is inserted into bore 28 and extended through aperture 65, mounting boss 66 and ultimately, into aperture 76, where the retainer 34 is threaded into the fixed surface 74, such that the head 40 of the retainer 34 protrudes from the flat section 26, approximately 0.01 inches to provide a degree of protection to the cover 12.

FIG. 3 shows a side view of the cover 12, printed circuit board 56, and base plate 64. The flat surface 26 of the outer cover 12 includes at its center a bore 28, which is defined at its outer edge by circular walls 29 and 30. The first circular wall 29 defines the counterbore 32 to accommodate the head of the retainer bolt. The second circular wall 30 defines the bore 28 for the threaded shaft of the bolt. The bore 28 defines an axis which extend longitudinally through the bore 28.

In the present embodiment of the infrared receiver mount 10, the angle formed by the conical section 24, with respect to the axis formed by bore 28, is preferably 45 degrees. This particular angle was selected based on the distance between carriages, the height of the carriages in a mobile carriage system and the distance from the infra red source to the infra red receiver 50. As one skilled in the art will readily recognize, the angle of the conical section 24 of the outer cover 12 need not be 45 degrees, however. Any angle which allows the infrared receiver 50 to properly receive an infrared signal when properly positioned toward an infrared transmitter would be acceptable.

As part of the electrical connection of the infrared receiver 50, the wires 58 travel through wiring hole 60, which is defined at its outer edge by boss 62. Boss 62 extends transversely to the base plate 64. The base plate 64 further includes a mounting boss 66, extending in the opposite direction from wiring boss 62 to provide proper spacing between the printed circuit board 56 and base plate 64 to allow enough wire 58 for rotation of cover 12 with respect to base plate 64. An anti-rotation pin 77 is molded into the outer cover 12 at one end with its other end inserted into a hole 79 in the printed circuit board 56. It is in this manner that the printed circuit board 56 with its infrared receiver 50 and the cover 12 rotate as a unit with respect to the base plate 64. When the mounting boss 60 is inserted into aperture 72 (FIG. 2), the infrared receiver assembly 10 cannot rotate around retainer 34. The result is that infrared receiver 50 is locked into the intended orientation.

FIG. 4 shows a side view of the infrared receiver printed circuit board 56 inserted into the outer cover 12. The infrared receiver 50, mounted to the printed circuit board 56, extends past wall 48 and through the conical section 24 of the outer cover 12 to permit the reception of any infrared radiation directed towards the conical section 24. The wall 48 is countersunk to permit a wider effective reception angle. The printed circuit board 56 is inserted into the outer cover 12 in such a way that the outer cover 12 and the infrared receiver assembly 56 move as a single unit. Therefore, rotation of the outer cover 12 results in a corresponding move in the infrared receiver 50.

Referring now to FIG. 5, the base plate 64 is shown in position such that mounting boss 66 is in contact with printed circuit board 56. In this position, the infrared receiver 50 will not move with respect to the base plate 64, unless the outer cover 12 is disengaged from the base plate 64 to allow rotation of the outer cover 12 and, correspondingly, the infrared receiver 50.

The base plate 64 also includes at its center a base cavity 67. The base cavity 67 preferably has a hexagonal shape and is sized to receive a hexagonal nut 69 (FIG. 2), which in combination with the retainer 34 facilitates the assembly of the infrared receiver 50 into discrete orientations with respect to the base plate 64. The preselection of discrete orientations is desirable during the manufacturing process.

Referring to FIG. 6, the conical section 24 of the outer cover 12 is shown partially sectioned to reveal the spaced grooves 18 as defined between the projections 20 of the cover 12, and locked in place with the tabs 70 of the disk 56. Each groove 18 along inner surface 16 represents a discrete potential locking position for the outer cover 12. Angular adjustment would occur by selecting a different groove 18 and tab 70 combination to complete the locking function of the outer cover 12.

FIG. 7 shows a top view of a mobile carriage system 78. An infrared transmitter 80, constructed of an array or cluster of LEDs 83, is mounted to a first carriage 84. The first carriage 84 is separated from a second carriage 86 by parallel rails 88, along which the carriages 84 and 86 are moveable with respect to one another. A plurality of infrared receivers 50 are spaced along carriage face 85 of carriage 86. The number and location of the infrared receivers 50 are determined by the spacing between the carriages and the height of the carriages. The infrared receiver mounts 10 direct reception of infrared transmissions toward the infrared transmitter 80. Each infrared receiver mount 10 is rotated to a desired position during initial installation to aim the infrared receivers 50 at the common infrared transmitter 80. Consequently, each infrared receiver mount 10 must be locked into a discrete position to properly aim its infrared receiver 50 towards the LED array 80 in order properly receive the beams 90. Although five infrared receivers 50 are shown, it is generally understood that at least one infrared transmitter 80 and two infrared receivers 50 are the minimum number necessary to provide a generally acceptable level of protection. The number selected depends on the length of the carriages.

Figure 8:
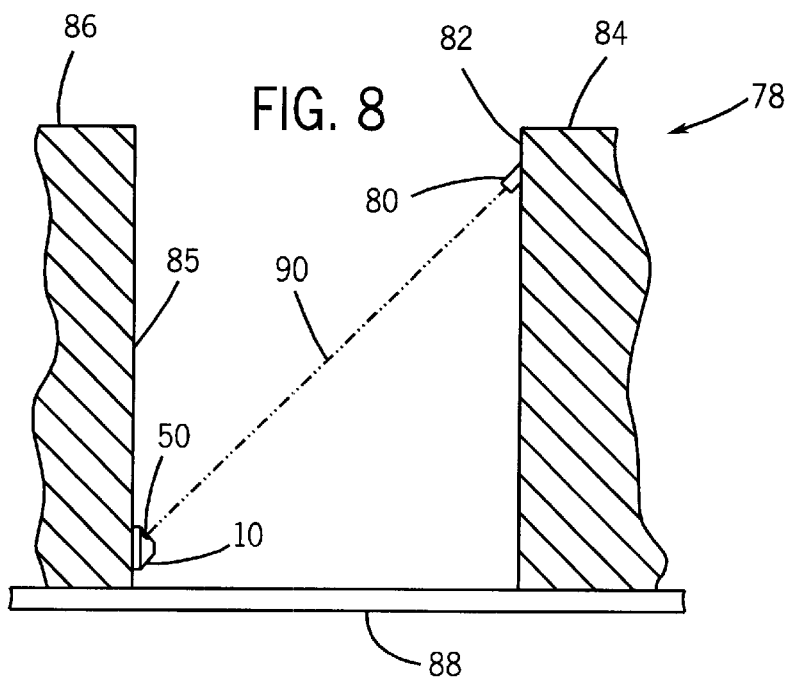
FIG. 8 is a side view of the mobile carriage system taken along lines 8—8 of FIG. 7 showing the relative position of the infrared transmitter and infrared receiver in accordance with one aspect of the present invention.

Referring to FIG. 8, a side view of the mobile carriage system is shown with the infrared transmitter 80 projecting its beam 90 from a top portion 82 of the first carriage 84 in a generally downward direction. The beam is directed to as many infrared receivers 10 located on the second carriage 86 as are necessary to sweep the area between the carriages, such that a person or other obstacle between the carriages would break at least one of the beams 90 at some point during an aisle closure and thereby be detected by a respective receiver 50 mounted in mount 10. The goal is to ensure that any obstacle located between the carriages would interfere with at least one of the beams 90 and initiate a hazard response by preventing movement of the carriages or stopping a moving carriage. Alternatively, the transmitter 80 could be mounted on the first carriage 84 and project upwards toward receivers mounted at the top of the shelving on the second carriage 86.

In some applications, it has been found necessary to physically space the infrared receiver mount 10 away from the carriage 86 so that the reception of an infrared receiver 50 is not interrupted by an object protruding from the carriage itself. The infrared receiver mount 10 could be mounted further away from the carriage 86 with spacers, for example, in order to optimize reception of the infrared receiver 50.

To properly position the infrared receiver 50 in the mount 10, the retaining bolt 34 is loosened and the outer cover 12 is pulled outward, such that the tabs 70 of the base plate 64 are disengaged from the grooves 18 of the outer cover 12. The outer cover 12 is then rotated to a desired position, thereby also moving the infrared receiver 50, since the infrared receiver 50 and the outer cover 12 move as one unit with respect to the base plate 64. After the desired direction is obtained, the outer cover 12 is placed on the base plate 64, such that the tabs 70 may reengage the grooves 18. The tabs 70 and grooves 18 define predetermined intervals so that an installer or maintenance person need only get close to the desired angle of reception for the infrared receiver 50 to engage the tabs 70 and grooves 18 at the desired predetermined interval. If the exact position of the outer cover 12 does not correspond to an exact tab 70 and groove 18 pair, slight rotation of the outer cover 12 to the next interval will align the tabs 70 with the next available grooves 18. The retaining bolt 34 is then tightened and proper alignment is ensured.

The present invention has been described in terms of the preferred embodiment, and it is recognized that equivalents, alternatives, and modifications, aside from those expressly stated, are possible and within the scope of the appending claims.

I claim:

1. An electromagnetic radiation receiver mount comprising:
   a cover assembly having an electromagnetic radiation receiver opening and having an electromagnetic radiation receiver positioned therein such that the electromagnetic radiation receiver is positioned in the electromagnetic radiation receiver opening to receive light, the cover assembly having a first portion of a locking mechanism;
   a base plate removably engageable with the cover assembly, the base plate having a second portion of the locking mechanism engageable and lockable with the first portion of the locking mechanism in the cover assembly; and
   wherein the locking mechanism has discrete engagement points and allows for full rotation of the cover assembly with respect to the base plate along an axis of rotation to aim the electromagnetic radiation receiver in a predetermined number of discrete reception positions, the predetermined number of discrete reception positions being substantially parallel to the axis of rotation.

2. The electromagnetic radiation receiver mount of claim 1 wherein the second portion of the locking mechanism in the base plate includes a series of tabs and the first portion of the locking mechanism in the cover assembly includes an inner portion having a plurality of grooves, and wherein the tabs of the base plate and the grooves of the cover assembly form the discrete reception positions of the electromagnetic radiation receiver.

3. The electromagnetic radiation receiver mount of claim 1 wherein the base plate further includes a laterally extending mounting boss to space the base plate from the cover assembly and a wiring hole to permit an electrical connection to the electromagnetic radiation receiver.

4. The electromagnetic radiation receiver mount of claim 1 further comprising two angles of reception of the electromagnetic radiation receiver, a first angle of reception formed by a mounting angle of the electromagnetic radiation receiver in the cover assembly, and a second angle of reception formed by rotation of the cover assembly with respect to the base plate.

5. The electromagnetic radiation receiver mount of claim 1 wherein the cover assembly further comprises a conical face and the electromagnetic radiation receiver is mounted in the conical face to create a first given angle of reception.

6. The electromagnetic radiation receiver mount of claim 5 wherein the conical face is at a substantially 45° angle to the base plate.

7. The electromagnetic radiation receiver mount of claim 1 wherein the cover assembly further comprises an electromagnetic radiation receiver assembly disk fixedly attached to a back side of the cover assembly and having the electromagnetic radiation receiver mounted thereon.

8. The electromagnetic radiation receiver mount of claim 1 incorporated into a carriage system having an electromagnetic radiation transmitter mounted on at least one first carriage and the electromagnetic radiation receiver mounted within the electromagnetic radiation receiver mount on at least one second carriage such that an obstacle between the carriages is detectable by the electromagnetic radiation receiver.

9. The electromagnetic radiation receiver mount of claim 1 further comprising a removable retainer extending through the cover assembly and the base plate and engageable with a mounting surface to mount the cover assembly to the base plate and the electromagnetic radiation receiver mount to the mounting surface, the removable retainer extending slightly from the cover assembly to transfer an inadvertent impact directly to the mounting surface.

10. An electromagnetic radiation receiver mount comprising:
    a cover assembly having an electromagnetic radiation receiver opening and having an electromagnetic radiation receiver therein such that the electromagnetic radiation receiver is permanently positioned in the electromagnetic radiation receiver opening to receive light;
    a base plate fixedly attachable to a fixed surface and engageable with the cover assembly; and
    a means for locking the cover assembly to the base plate to define a number of reception positions parallel to an axis of rotation and for allowing unlocking of the cover assembly from the base plate and allow rotation of the cover assembly with respect to the base plate.

11. The electromagnetic radiation receiver mount of claim 10 wherein the means for locking comprises a plurality of tabs on one of the cover assembly and the base plate, and a plurality of interlocking grooves on the other of the cover assembly and the base plate.

12. The electromagnetic radiation receiver mount of claim 10 wherein the c over assembly further comprises a conical face and the electromagnetic radiation receiver is mounted in the conic al face to create a first given angle of reception.

13. The electromagnetic radiation receiver mount of claim 10 wherein the cover assembly further comprises an electromagnetic radiation receiver assembly disk fixedly attached to a back side of the cover assembly and having the electromagnetic radiation receiver mounted thereon.

14. The electromagnetic radiation receiver mount of claim 10 incorporated into a carriage system having an electromagnetic radiation transmitter mounted on at least one first carriage and the electromagnetic radiation receiver mounted within the electromagnetic radiation receiver mount on at least one second carriage such that an obstacle between the carriages is detectable by the electromagnetic radiation receiver.

15. An electromagnetic radiation receiver mount comprising:
    a base plate including an outer edge having a series of tabs in spaced relation, wherein the series of tabs define a number of predetermined intervals;
    an outer cover having an inner portion, the inner portion having a plurality of grooves in spaced relation such that the grooves are capable of receiving the tabs of the outer edge of the base plate, the outer cover being in locking relationship to the base plate when the base plate tabs are received into the outer cover grooves and wherein the outer cover is disengageable with the base plate;

an electromagnetic radiation receiver assembly interposed between the base plate and the outer cover and including an electromagnetic radiation receiver mounted to the electromagnetic radiation receiver assembly; and wherein the outer cover includes an outer conical section and an aperture sized to receive the electromagnetic radiation receiver at a pre-selected angle with respect to the base plate in the outer conical section of the outer cover such that the outer cover and the electromagnetic radiation receiver are rotatable with respect to the base plate in the predetermined intervals when the outer cover is disengaged from the base plate.

16. The electromagnetic radiation receiver mount of claim 15 wherein the base plate, the outer cover and the electromagnetic radiation receiver assembly each include a mounting hole therein, the mounting holes being in aligned relation when the electromagnetic radiation receiver mount is assembled to receive a mounting retainer therethrough and threadedly engaging a fixed surface.

17. The electromagnetic radiation receiver mount of claim 15 wherein the outer cover includes an outer conical section such that the electromagnetic radiation receiver is mounted at a preselected angle with respect to the base plate in the outer conical section of the outer cover.

18. The electromagnetic radiation receiver mount of claim 16 wherein the outer cover mounting hole is aligned along, and forms, an orientation axis, and wherein the outer conical section is at a substantially 45° angle with respect to the orientation axis.

19. The electromagnetic radiation receiver mount of claim 15 wherein the base plate further includes a wiring hole to permit an electrical connection to the electromagnetic radiation receiver, and a mounting boss to space the base plate from the outer cover and provide space for excess wire thereby permitting complete rotation of the outer cover with respect to the base plate.

20. The electromagnetic radiation receiver of claim 15 wherein the tabs of the base plate are spaced equally about the outer edge of the base plate to provide approximately 22 degree discrete positions.

21. The electromagnetic radiation receiver mount of claim 15 further including a retainer extending through the outer cover for maintaining the outer cover in a fixed position with respect to the base plate.

22. The electromagnetic radiation receiver mount of claim 21 wherein the outer cover is formed of a plastic material and the retainer extends slightly from the outer cover thereby providing protection to the plastic outer cover.

23. An electromagnetic radiation receiver mount comprising:

an outer cover rotatable about an axis of rotation having an electromagnetic radiation receiver opening and having an electromagnetic radiation receiver therein such that the electromagnetic radiation receiver is positioned in the electromagnetic radiation receiver opening to receive light at a first angle of reception;

a base plate fixedly attachable to a fixed surface and engageable with the outer cover; and a locking mechanism for maintaining the outer cover on the base plate in one of a number of rotatable positions, the rotatable positions of the outer cover defining a second angle of reception of the electromagnetic radiation receiver, wherein the rotatable positions are parallel to the axis of rotation.

24. The electromagnetic radiation receiver mount of claim 23 wherein the cover assembly further comprises a conical face and the electromagnetic radiation receiver is mounted in the conical face to create the first given angle of reception.

25. The electromagnetic radiation receiver mount of claim 23 wherein the locking mechanism comprises a series of tabs in the base plate and a plurality of grooves in the outer cover, and wherein the tabs of the base plate and the grooves of the outer cover form the rotatable positions of the electromagnetic radiation receiver.

26. The electromagnetic radiation receiver mount of claim 23 incorporated into a carriage system having an electromagnetic radiation transmitter mounted on at least one first carriage and the electromagnetic radiation receiver mounted within the electromagnetic radiation receiver mount on at least one second carriage such that an obstacle between the carriages is detectable by the electromagnetic radiation receiver.

27. A mobile carriage system comprising:

first carriage;

a second carriage facing the first carriage and moveable with respect to the first carriage;

an electromagnetic radiation transmitter mounted to one of the first carriage and the second carriage, wherein the transmitter is configured to transmit electromagnetic radiation;

at least two electromagnetic radiation receivers mounted to the other of the first carriage and the second carriage, wherein each receiver is configured to receive electromagnetic radiation from the electromagnetic radiation transmitter;

a receiver mount for mounting the electromagnetic radiation receiver to one of the first carriage and the second carriage, the receiver mount having a base plate including a first portion of a locking mechanism, an outer cover having a second portion of the locking mechanism such that the locking mechanism allows rotation of the outer cover with respect to the base plate, and wherein at least one of the electromagnetic radiation receivers is mounted to the outer cover;

wherein the electromagnetic radiation receivers are mounted at a compound angle defined by a first angle of reception created by an angled construction of at least a portion of the outer cover, and a second angle of reception created by rotation of the outer cover with respect to the carriage it is mounted on; and wherein the second portion of the locking mechanism in the base plate includes a series of tabs and the first portion of the locking mechanism in the outer cover includes a plurality of grooves, and wherein the tabs of the base plate and the grooves of the outer cover form discrete reception positions of the electromagnetic radiation receiver parallel to an axis of rotation.

28. The system of claim 27 wherein the cover assembly further comprises a conical face and the electromagnetic radiation receiver is mounted in the conical face to create the first angle of reception.

29. The system of claim 27 further including a mounting retainer for maintaining the outer cover in one of a number of positions with respect to the base plate.

30. A method of orienting an electromagnetic radiation signal receiver comprising the step of:

providing an electromagnetic radiation receiver mount having a base plate with one portion of a locking mechanism thereon an outer cover with a second portion of the locking mechanism therein, and an electromagnetic radiation receiver mounted to the outer cover, the locking mechanism maintaining the cover in one of a number of fixed positions with respect to the base plate and a retainer securing the outer cover to the base plate, wherein the outer cover is configured to be rotatable 360° with respect to the base plate;

loosening the retainer from the outer cover;

disengaging the locking mechanism the base plate from the locking mechanism of the outer cover; and rotating the outer cover with respect to the base plate into one of the fixed number of positions parallel to an axis of rotation such that each position corresponds to a change in reception direction of the electromagnetic radiation receiver.

31. The method of claim 30 further comprising the step of reengaging the locking mechanism to lock the outer cover to the base plate after selection of another direction of the electromagnetic radiation receiver.

32. The electromagnetic radiation receiver mount of claim 1 wherein the cover assembly rotates in a single plane.

33. An electromagnetic radiation receiver mount comprising:

a cover assembly having an electromagnetic radiation receiver opening and an electromagnetic radiation receiver assembly disk fixedly attached to a back side of the cover assembly and having an electromagnetic radiation receiver positioned on the disk such that the electromagnetic radiation receiver is positioned in the electromagnetic radiation receiver opening to receive light, the cover assembly having a first portion of a locking mechanism;

a base plate removably engageable with the cover assembly and substantially parallel with the electromagnetic radiation receiver assembly disk, the base plate having a second portion of the locking mechanism engageable and lockable with the first portion of the locking mechanism in the cover assembly; and wherein the locking mechanism has at least two end points with a plurality of discrete, latchable positions therebetween and allows for rotation of the cover assembly with respect to the base plate to aim the electromagnetic radiation receiver in a predetermined number of discrete reception positions.

34. The electromagnetic radiation receiver mount of claim 33 wherein the second portion of the locking mechanism in the base plate includes a series of tabs and the first portion of the locking mechanism in the cover assembly includes an inner portion having a plurality of grooves, and wherein the tabs of the base plate and the grooves of the cover assembly form the discrete reception positions of the electromagnetic radiation receiver.

35. The electromagnetic radiation receiver mount of claim 33 wherein the base plate further includes a laterally extending mounting boss to space the base plate from the cover assembly and a wiring hole to permit an electrical connection to the electromagnetic radiation receiver.

36. The electromagnetic radiation receiver mount of claim 33 further comprising two angles of reception of the electromagnetic radiation receiver, a first angle of reception formed by a mounting angle of the electromagnetic radiation receiver in the cover assembly, and a second angle of reception formed by rotation of the cover assembly with respect to the base plate.

37. The electromagnetic radiation receiver mount of claim 33 wherein the cover assembly further comprises a conical face and the electromagnetic radiation receiver is mounted in the conical face to create a first given angle of reception.

38. The electromagnetic radiation receiver mount of claim 37 wherein the conical face is at a substantially 45° angle to the base plate.

39. The electromagnetic radiation receiver mount of claim 33 wherein the cover assembly further comprises an electromagnetic radiation receiver assembly disk fixedly attached to a back side of the cover assembly and having the electromagnetic radiation receiver mounted thereon.

40. The electromagnetic radiation receiver mount of claim 33 incorporated into a carriage system having an electromagnetic radiation transmitter mounted on at least one first carriage and the electromagnetic radiation receiver mounted within the electromagnetic radiation receiver mount on at least one second carriage such that an obstacle between the carriages is detectable by the electromagnetic radiation receiver.

41. The electromagnetic radiation receiver mount of claim 33 further comprising a removable retainer extending through the cover assembly and the base plate and engageable with a mounting surface to mount the cover assembly to the base plate and the electromagnetic radiation receiver mount to the mounting surface, the removable retainer extending slightly from the cover assembly to transfer an inadvertent impact directly to the mounting surface.

* * * * *